United States Patent [19]

Zavoda

[11] Patent Number: 4,885,983
[45] Date of Patent: Dec. 12, 1989

[54] SELF-RETAINING DIAPHRAGM SEAL

[75] Inventor: John R. Zavoda, Houston, Tex.

[73] Assignee: Zavoda Manufacturing Co., Inc., Houston, Tex.

[21] Appl. No.: 198,106

[22] Filed: May 24, 1988

[51] Int. Cl.$^4$ ............ F01B 19/00; F16J 3/00
[52] U.S. Cl. ............ 92/104; 92/98 R; 73/715
[58] Field of Search ............ 92/91, 96, 98 R, 103 K, 92/103 F, 103 M, 89, 90, 99, 103 SD, 104; 403/326, 405.1; 73/715, 716, 717, 718, 719, 720–730

[56] References Cited

U.S. PATENT DOCUMENTS

| | | | |
|---|---|---|---|
| 2,220,902 | 11/1940 | Hastings et al. | 92/104 |
| 2,762,394 | 9/1956 | Hastings | 92/104 |
| 2,913,008 | 11/1959 | Cordero | 92/104 |
| 3,072,150 | 1/1963 | Hastings et al. | 92/98 R |
| 3,289,550 | 12/1966 | Watson | 92/104 |
| 3,340,734 | 9/1967 | St. Clair et al. | 92/104 |
| 3,352,211 | 11/1967 | Jorgensen et al. | 92/104 |
| 3,645,139 | 2/1972 | Zavoda | 73/406 |
| 3,938,361 | 2/1976 | Claesson et al. | 72/62 |
| 3,949,583 | 4/1976 | Syvakari | 72/63 |
| 4,056,009 | 11/1977 | Sonderegger et al. | 73/406 |
| 4,109,535 | 8/1978 | Reed et al. | 73/706 |
| 4,136,603 | 1/1979 | Doyle, Jr. | 92/103 M |
| 4,314,480 | 2/1982 | Becker | 73/706 |
| 4,375,182 | 3/1983 | Zavoda | 92/103 M |
| 4,541,282 | 9/1985 | Averweck | 73/715 |
| 4,646,700 | 3/1987 | Tuckey | 92/103 M |

FOREIGN PATENT DOCUMENTS

| | | | |
|---|---|---|---|
| 0082827 | 5/1985 | Japan | 73/715 |
| 0643763 | 1/1979 | U.S.S.R. | 73/715 |

Primary Examiner—Edward K. Look
Assistant Examiner—Thomas Denion
Attorney, Agent, or Firm—Harrison & Egbert

[57] ABSTRACT

A fluid pressure-responsive diaphragm comprising a discal body and a holding ring. The holding ring is fastened to the discal body and has an outwardly turned lip formed at the inner edge of the holding ring. The holding ring has a different thickness than the thickness of the discal body. Both the discal body and the holding ring are made of metallic substances. The discal body has a plurality of annular corrugations in a radial periodic waveform configuration and a plurality of radially extending spokes in a circumferential periodic waveform conforming to and integrated with the peaks and valleys of the annular corrugations. The holding ring is fastened to and aligned with the periphery of the discal body and the outwardly turned lip is adjacent to the outermost annular corrugation. A compressible seal is juxtaposed within the area defined by the outwardly turned lip and a surface of the holding ring.

15 Claims, 4 Drawing Sheets

SELF-RETAINING DIAPHRAGM SEAL

TECHNICAL FIELD

The present invention relates to an instrument for recording or indicating pressure and, more particularly, to a diaphragm seal for such an instrument.

BACKGROUND ART

In various process industries, particularly the chemical process industries, various liquids, gases or slurries are maintained under vacuum or under pressure, either in vessels or in flow conduits, and the pressure values must be monitored. For this purpose, suitable gauges or recording instruments are mounted on the process vessels or on the flow lines or are remotely coupled thereto, to sense, indicate and record the existing pressure values.

In most chemical processes, as well as in many other process industries, it is both necessary and desirable to isolate the pressure sensing means of the recording instrument from the abrasive or corrosive or gumming action of the process material so that the sensing means will not be subjected to undue deterioration, injury or wear. To accomplish this isolation, it is common practice to provide a flange member or similar coupling unit having a cavity in communication with the pressure recording instrument. This instrument flange member is secured in abutting relationship to a process flange member which has a cavity in communication with the pressure fluid to be monitored. A flexible diaphragm of metal, rubber, or synthetic resin serves to partition the instrument cavity from the process fluid cavity and is secured between the coupling or flange members at its marginal positions. A suitable compressive sealing gasket overlays the secured marginal portion of the diaphragm to effect the necessary seal on the margin of the diaphragm when the coupling members are bolted together or otherwise secured in operational abutment.

One side of the flexible diaphragm is thereby exposed to the pressure of the process fluids. The cavity in the instrument flange on the other side of the flexible diaphragm is filled with light oil or other suitable hydraulic fluid for communication with the pressure sensing means. The central portion of the flexible diaphragm is displaced or expanded in response to pressure fluctuations from the process fluid cavity and transmits these changing pressure values through the hydraulic fluid medium in the instrument flange cavity for sensing by recording gauge or instrument.

After some period of use, whose duration depends greatly upon the character of the process fluid, the process fluid cavity as well the process side of the flexible diaphragm will have gathered or accumulated a sufficient amount or quantity of deposits of sludge or precipitates or other solids from the process fluids to which it is exposed, so that cleaning of the process cavity and the process flange becomes necessary. The frequency of this cleaning can be diminished by the use of various forms of "flush-out" arrangements and fittings in a manner known to the art, but eventually a more thorough cleaning becomes mandatory and requires disassembly of the unit for access to the interior of the process flange member. Inasmuch as the marginal portion of the diaphragm is clamped between the two flange members, it no longer has any securement when the flange members are uncoupled for disassembly and cleaning. Its seal with the hydraulic instrument fluid is broken when the flanges are disassembled. This ordinarily results in the loss of all or a good part of this hydraulic fluid which must then be replaced when the unit reassembled. The replacement of the hydraulic fluid is not only a tedious and time-consuming task, but can also result in the necessity for recalibrating the unit as a result of there being a greater or lesser quantity of the replacement hydraulic fluid than was contained in the unit before the disassembly. The sealing gaskets will ordinarily have acquired a permanent set which makes it necessary for the gasket to be replaced after the cleaning operation has been completed and the unit is to be reassembled. If the gasket is not replaced, it is quite likely that an imperfect seal between the coupling members will result on the reassembly of the unit and that leakage will occur.

A prior art patent that has attempted to address this problem is U.S. Pat. No. 3,645,139 issued on February 29, 1972, to the present inventor. This patent describes a flexible diaphragm having an annular groove around its periphery for the purpose of defining a resilient shoulder. The diaphragm is mounted in a coupling member which communicates with the instrument and is snapped into detachable securement over a projection or shoulder of the coupling member, which fits into the annular groove. The groove may carry an O-ring or similar compressible seal to effect the sealing engagement between the seat of the groove and the inserted shoulder. In actual practice, this diaphragm was manufactured from TEFLON material and each of the grooves were machined into the TEFLON material. This self-retaining diaphragm seal has proven, in use, to be very effective when it is necessary to uncouple the flange members for cleaning or other attention. The diaphragm is retained by the instrument flange member in sealing engagement with the hydraulic fluid without any reliance upon any clamping securement between the coupling members. Importantly, however, it was found to be very difficult to manufacture the invention of U.S. Pat. No. 3,645,139 from metallic materials. The many desirable qualities of sensitivity and durability are found in TEFLON but are generally considered incompatible qualities in metal. Additionally, the machining processes required to manufacture the attachment mechanism of this TEFLON diaphragm were found virtually impossible for metal diaphragms.

In designing metallic pressure-responsive diaphragms, two generally incompatible characteristics are sought to be maximized sensitivity and durability. Sensitivity as measured by the force or pressure necessary to temporarily deform or deflect the diaphragm directly affects the accuracy of the pressure measurement. Durability affects both accuracy and practicality; if the diaphragm lacks durability, it can become permanently deformed, causing inaccuracy or rupture, thereby causing damage to the recording mechanism. The less durable a diaphragm is, the more often it must be replaced, causing costly and undesirable "downtime".

Increased durability is achieved at the expense of sensitivity. To achieve accuracy coupled with durability, diaphragm designers have focused on structures whose effective surface area remains substantially constant over a moderately wide range of deflection and whose surfaces contain corrugations or convolution to permit deflection of the diaphragm with minimal stress on the diaphragm fibers. The diaphragm material must, of course, be thin enough to flex easily, yet thick enough to resist corrosion and permanent deformation or rupture. When made of metal, a diaphragm for the pressure recording instrument is typically 0.004 to 0.005 inches thick and about two to four inches in diameter.

Whatever the exact thickness or composition of the diaphragm material, a flat diaphragm is subject to two distinct types of tensile stress as the diaphragm is deflected under pressure. One of these is radial stress; the other is circumferential stress (commonly called "hoop stress"). These stresses occur because, as pressure is applied to one side of a flexible diaphragm, the diaphragm will flex or "dome out" in the opposite direction, thereby assuming a convex or parabolic profile. The diaphragm material will be stretched both along its diameter (radial stress) and circumferentially. It is evident that the surface area of the diaphragm in its domed position is greater than the surface area of the diaphragm in its rest position. This enlargement of the diaphragm surface stretches the diaphragm fibers circumferentially thereby creating "hoop stress".

U.S. Pat. No. 4,375,182, issued on March 1, 1983, to the present inventor, is entitled "Ultra-Sensitive Diaphragm With Dual Stress-Relief Structures." It is the object of this invention to overcom both the limitations of a trough-shaped annular corrugation and the stiffening-neutralizing effect of spokes by means of a novel diaphragm structure that has a plurality of radially extending corrugations with multiple annular corrugation in an integrated structure that retains, rather than disrupts, the annular waveform configuration and thereby substantially increases diaphragm sensitivity and durability through the simultaneous reduction of radial and circumferential tensile stresses. By using the very thin material, this patented diaphragm seal offered significant advantages over prior art metallic seals. Metallic seals are ultimately required, over TEFLON, in various process industries. It has been found that TEFLON seals allow chlorine molecules to seep through. There are other processes, using chlorine derivatives or compounds, which cause similar problems for TEFLON diaphragms. As a result, in the chemical and process industry, there is a real need for the use of metallic diaphragm seals.

In the past, it has been necessary to fixedly mount the diaphragm of U.S. Pat. No. 4,375,182 to the instrument flange by welding the diaphragm at the periphery to the instrument flange. As a result, the desirable features of the self-retaining diaphragm seal of U.S. Pat. No. 3,645,139 were impossible to incorporate with the metal diaphragm. The process of welding the diaphragm is a time consuming and expensive process. Additionally, if it becomes necessary to replace the metallic diaphragm, the associated instrument flange must also be replaced.

It is an object of the present invention to provide an ultra-sensitive metallic diaphragm with a snap-in self-retaining quality.

It is an other object of the present invention to provide such a diaphragm that maintains an effective seal between the process flange in the instrument flange.

It is a further object of the present invention to provide such a diaphragm that offers the sensitivity of a thin metallic diaphragm.

It is still a further object of the present invention to provide a diaphragm seal that is relatively inexpensive to manufacture and assemble.

These and other objects and advantages of the present invention will become apparent from the reading of the attached specification and appended claims.

SUMMARY OF THE INVENTION

The present invention is a fluid pressure-responsive diaphragm comprising a discal body and a holding ring fastened to the discal body. This holding ring has an outwardly turned lip formed at the inner edge of the holding ring. This holding ring has a thickness greater than the thickness of the discal body.

The discal body has, preferably, a material thickness of not greater than 0.005 inches. The discal body has a plurality of annular corrugations in a radial periodic waveform configuration and a plurality of radially-extending spokes in the discal body in a circumferential periodic waveform conforming to and integrated with the peaks and valleys of the annular corrugations.

The holding ring has a material thickness of between 0.005 inches and 0.022 inches. The holding ring is fastened to and aligned with the periphery of the discal body. The outwardly turned lip is adjacent to the outermost annular corrugation. The holding ring is welded to the periphery of the discal body. The outwardly turned lip has a roughly U-shaped configuration. A compressible seal is juxtaposed within the area defined by this outwardly turned lip. Both the discal body and the holding ring are metallic materials.

The present invention also includes the method of manufacturing this diaphragm seal. This method of manufacturing comprises the steps of: (1) stamping a discal body from a sheet of metal having a thickness not greater than 0.005 inches; (2) stamping a holding ring from a thicker sheet of metal; (3) forming an outwardly turned lip at the inner edge of the holding ring; (4) welding the periphery of the discal body to the periphery of the holding ring such that the holding ring is affixed and juxtaposed against the discal body. This method further includes the step of inserting an O-ring into the area defined by the outwardly turned lip such that the lip exerts a compressive force upon the O-ring.

The step of stamping the discal body further comprises the steps of: (1) forming a plurality of annular corrugations in a radial periodic waveform in the discal body; and (2) forming a plurality of radially extending spokes in the discal body in a circumferential periodic waveform conforming to and integrated with the peaks and valleys of the annular corrugations.

DETAILED DESCRIPTION OF THE INVENTION

Figure 1:
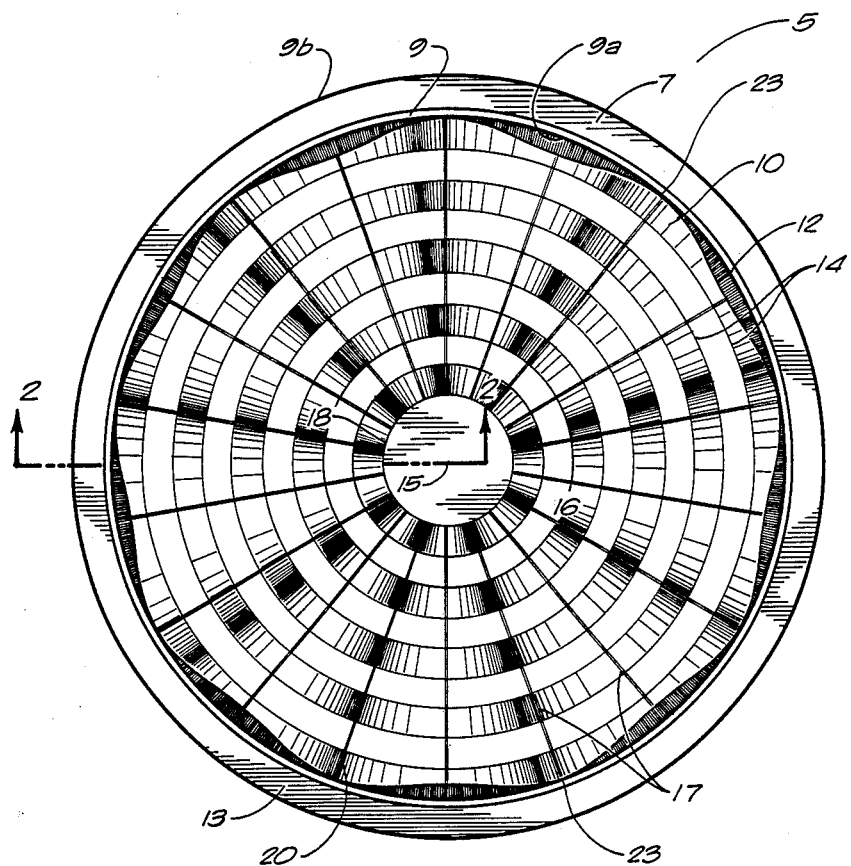
FIG. 1 is a top plan view of the diaphragm seal in accordance with the preferred embodiment of the present invention.

Referring to FIG. 1, there is shown at 5 the fluid pressure-responsive diaphragm seal in accordance with the preferred embodiment of the present invention.

More particularly, there is shown a disc-like or discal diaphragm body 10 of circular construction. This discal body 10 is unitarily made or formed, by stamping, from any suitable self-sustaining materials, preferably metal. For purposes of practicality, the material of which the discal body 10 is made should be thick enough to be durable and resist corrosion. However, it should be thin enough to provide the necessary characteristics of flexibility, without fracture, which are required in a substantially planar diaphragm intended for use as a seal in association with pressure-responsive instruments. It has been found that the discal body may have up to 0.005 inches of metal material thickness. Importantly, however, the present invention is not intended to be limited to the particular thickness specified herein. Under many circumstances, a thicker diaphragm seal may be appropriate for a particular purpose.

Holding ring 7 is shown as fastened to the discal body 10. Holding ring 7 has an outwardly turned lip 9 formed along the inner edge 9a of the holding ring 7. As will be described hereinafter, it has been found that the holding ring 7 and the outwardly turned lip 9 should have a material thickness of between 0.005 inches and 0.002 inches. As stated previously, the actual dimensions and thicknesses of this holding ring 7 may be dependent upon particular circumstances. Such dimensions are only specified herein for the purposes for defining the preferred embodiment of the present invention. As can be seen in FIG. 1, the outer edge 9b of holding ring 7 is aligned with the periphery of the discal body 10.

Figure 2:
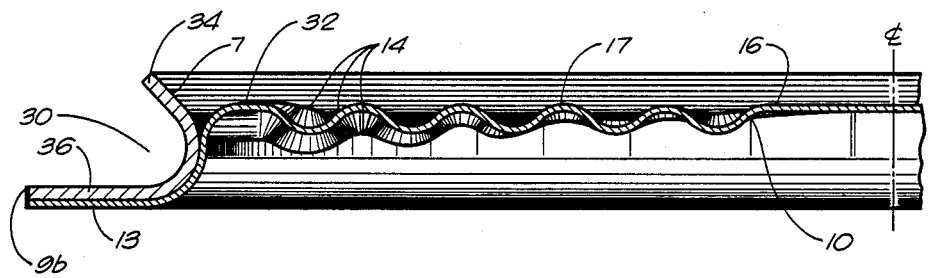
FIG. 2 is an enlarged cross-sectional view, taken as indicated on line 2—2 of FIG. 1.

As shown in FIGS. 1 and 2, the discal body 10 is provided with a plurality of annular corrugations 14 in a periodic waveform configuration, whereby each pair of corrugations represents a full periodic wavelength. One corrugation will extend in a direction upwardly from the nominal plane of the body 10, and its adjacent corrugation will extend downwardly from that plane to complete the periodic wave. As hereshown, the annular corrugations 14 extend from a point closely adjacent the periphery 12, adjacent the inner edge 9a of holding ring 7, to a plane closely adjacent the center 15 of the discal body 10, where a central hub 16 of suitable dimension is provided.

When the diaphragm is operative in an instrument assembly, any fluid pressure differential to which the diaphragm is exposed will cause deflection or displacement of the discal body 10 in one direction or the other, with the greatest axial deflection occurring at the central portion 16. This deflection of the diaphragm, from a planar position of rest to a bowed or domed position of operation, causes a stretching of the diaphragm material, most of which is reflected in a radial tensile stress in the discal body 10. The function of the annular corrugations is to minimize this radial tensile stress by introducing bendable or yieldable portions into the diaphragm body, which will minimize the linear stretch of the fibers in the body. This reduction of radial tensile stress permits the diaphragm body to have greater flexibility under deflection load and thereby greater sensitivity of response within its total operating range.

In addition to the above-mentioned radial stress which is created by pressure-responsive deflection of the diaphragm body, the bowing or doming of the discal body 10 also tends to create a circumferential tensile stress which, although perhaps not as great in magnitude as the radial stress, is nevertheless a significant factor in reducing the flexibility and accuracy of response of a planar diaphragm. Both the radial and the circumferential tensile stresses are of their greatest magnitude in the area of the body 10 which is closest to the periphery 12, and progressively diminishes toward the center 15 of the body.

The teachings of the prior art have been directed primarily to the reduction of the predominant radial stress by means of the annular corrugations. However, the introduction of annular corrugations to reduce radial stress has itself magnified the problem of circumferential tensile stress. This results from the fact that the annular corrugations create a sectional deformation of the body 10 which, although easing radial tensile stress, act as stiffening ribs to reduce circumferential flexibility and increase circumferential stress in response to body deflection.

It is known to those skilled in the art that the greater the amplitude or depth of the annular corrugations, and the closer the corrugations are to each other, the greater the flexibility that can be achieved, within practicable limits. Thus, if the peak-to-peak dimension or wavelength of these corrugations is compared to the depth or amplitude of these corrugations from peak-to-valley, a flexibility ratio can be established by dividing the amplitude by the wavelength. The larger this ratio value is, the greater the radial stress-relieving function of the annular corrugations. However, such a large and apparently desirable flexibility ratio is, conversely, also indicative of increased stiffening and increased deflection stress in the body in a circumferential direction. This factor has generally compelled the prior art to comprise and settle for less than the desired radial flexibility which could be achieved by the annular corrugations, so as to avoid augmenting the hoop stress by a stiffening effect in a circumferential direction.

The present invention not only reduces the inherent hoop stress, but also obviates the compounding of the problem resulting from the imposition of the annular corrugations of the discal body 10. This is accomplished by utilizing a plurality of radially-extending spokes 17 in a circumferential periodic waveform configuration which conforms to and is integral with the annular corrugations 14. The spokes 17 extend inwardly from the periphery 12 of the discal body 10 and follow the peaks and valleys of the annular corrugations. By utilizing the spokes to relieve circumferential tensile stress similarly to the manner in which the annular corrugations relieve radial tensile stress in the diaphragm body, the circumferential stiffening effect which would otherwise be produced by annular corrugations having a relatively high flexibility ratio, is minimized, thereby permitting the use of any desired flexibility ratio for the annular corrugations without concern for the offsetting circumferential stiffening effect which would occur if the spokes were not utilized.

Inasmuch as the radial tensile stress in the discal body 10 is customarily of greater magnitude than the circumferential tensile stress, it is not necessary that the waveform of the spoke 17 have as great a flexibility ratio as the flexibility ratio of the annular corrugations. In fact, to avoid undue stiffening of the discal body 10 in a radial direction of the spoke 17, the flexibility ratio of the spokes is preferably less than the flexibility ratio of the annular corrugations and, preferably, the annular corrugation waveform has a flexibility ratio at least twice as great as the flexibility ratio of the spoke waveform.

In order to effectively accomplish their circumferential stress-relieving function, the spokes should extend radially of the body 10, from the periphery 12, for a distance or dimension equal to at least fifty percent of the radius of the body 10. Preferably, the spokes should extend radially from the periphery to the hub 16.

Furthermore, inasmuch as the circumferential stress of the domed body is greatest at the periphery and diminishes toward the center 15 of the body, it has been determined that the utilization of the spokes 17 is most effective when the waveform of the spokes has its highest flexibility ratio in the zone adjacent the periphery 12. For this reason, the amplitude of the spokes is preferably greatest at the periphery and may progressively decrease in a direction toward the body. Thus, in its preferred form, each spoke is a half-waveform of somewhat semi-conical configuration, which extends from the periphery 12 of the body toward an apex or juncture 18. At its inward terminus the spoke closely approaches a waveform of substantially negligible amplitude and wavelength, such as shown in the drawings at a juncture adjacent the hub 16. The spokes are most effective in a continuous, uninterrupted waveform extending through 360 degrees of the circumference of the body 10.

A number of examples of the use of the waveform and configuration illustrated in FIG. 1 have been set forth in U.S. Pat. No. 4,375,182. Such details are incorporated herein by reference thereto. As such, it can be seen that the configuration of the discal body 10 offers advantages of flexibility and durability not found in the metallic diaphragm seals having only annular corrugations. As can be seen in FIG. 2, the holding ring 7 is shown as affixed to the clamping flange portion 13 of the discal body 10. It can be seen that the holding ring 7 has a thickness greater than the thickness of the discal body 10. After experimentation with the thickness of the holding ring 7, it was found that a holding ring 7, which has a thickness equal to the thickness of the discal body 10, will be insufficient to allow the discal body 10 to properly clamped to the instrument flange. After use and under normal pressures, the discal body 10 will buckle, and the holding ring 7 will release from the instrument flange. Also, after further experimentation, it was found that where the holding ring 7 has a thickness of 0.022 inches or greater, the discal body 10 will not flex properly because of the rigidity of the holding ring 7. As a result, it is believed necessary, for the proper operation of the diaphragm seal of the present invention, that the holding ring 7 should have a thickness of greater than 0.005 inches but less than 0.022 inches.

In FIG. 2, it can be seen that the holding ring 7 is welded at its periphery 9b to the clamping flange portion 13 of discal body 10. This welding accomplished by a plasma tig welder which provides excellent control over heat and the mixing of two metals together. Because of the small thicknesses of material utilized in this process, it is important to fuse the holding ring 7 against the surface of the discal body 10. The welding, illustrated in FIG. 2, is accomplished about the entire circumference of the holding ring 7 and the discal body 10.

Holding ring 7, in cross-section, has a roughly U-shaped configuration 30. A portion of this holding ring 7 fits adjacent and somewhat juxtaposed against the outermost corrugation 32 of discal body 10. These corrugations offer an aligning stop for the proper placement of this holding ring 7 prior to assembly and welding. Holding ring 7 has a portion 34 that extends upwardly from the horizontal section 36. This upwardly extending portion 34 is an outwardly turned lip 34 which serves to receive and retain a compressible seal juxtaposed within the U-shaped area 30. As shown in FIG. 2, the holding ring 7 is strongly adhered to this clamping flange area 13 of discal body 10.

Figure 3:
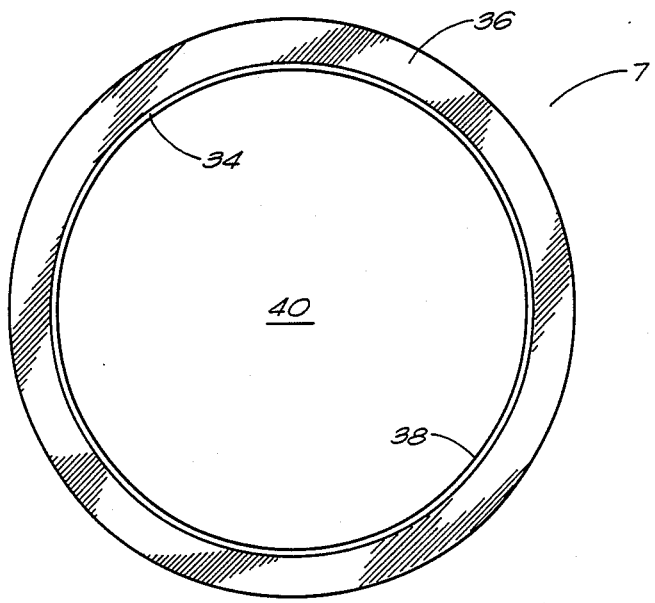
FIG. 3 is a top plan view of the isolated holding ring of the present invention.

FIG. 3, shows a top plan view of the holding ring 7. Holding ring 7 has a flat annular portion 36. The outwardly turned lip 34 extends from the inner edge 38 of the holding ring 7. The opening 40 exposes the corrugated surfaces of the discal body 10 and is aligned with the cavity of the instrument flange, to be described hereinafter.

Figure 4:
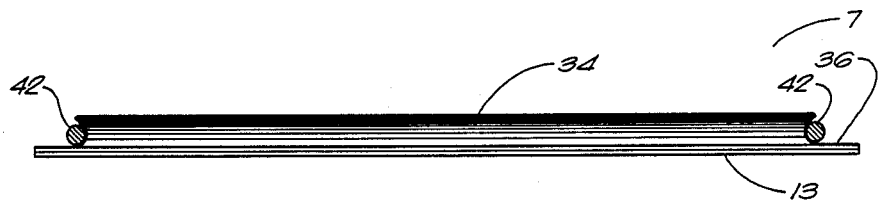
FIG. 4 is an enlarged side view of the holding ring of FIG. 3.

FIG. 4 is a closeup side view of the holding ring 7. Initially, it can be seen that the holding ring 7 is mounted onto the small, thin clamping flange 13 of the discal body 10. The flat matching surface 36 is welded at the periphery to this clamping flange 13. The outwardly turned lip 34 extends upwardly from and toward the viewer in FIG. 4. The shape of this U-shaped member 34 has a uniform configuration throughout the entire 360 degrees of the holding ring 7. It can be seen that the shape of this outwardly turned lip 34 is suitable for receiving compressible seal 42. Compressible seal 42, as illustrated, is an O-ring. The outwardly turned lip 34 is stamped and formed with the configuration illustrated in FIG. 4. This lip 34 is formed so as to coincide with the projection and groove in the instrument flange. The walls of the outwardly turned lip 34 exert a compressive force on the O-ring.

The purpose for the small O-ring is to reduce distortion and minimize hysteresis. Over long term operation, the volume of the O-ring will be proportional to the amount of distortion. The hysteresis effect is greatly diminished by utilizing a very small O-ring. This improves the quality of the diaphragm seals and increases reliability of test results.

Figure 5:
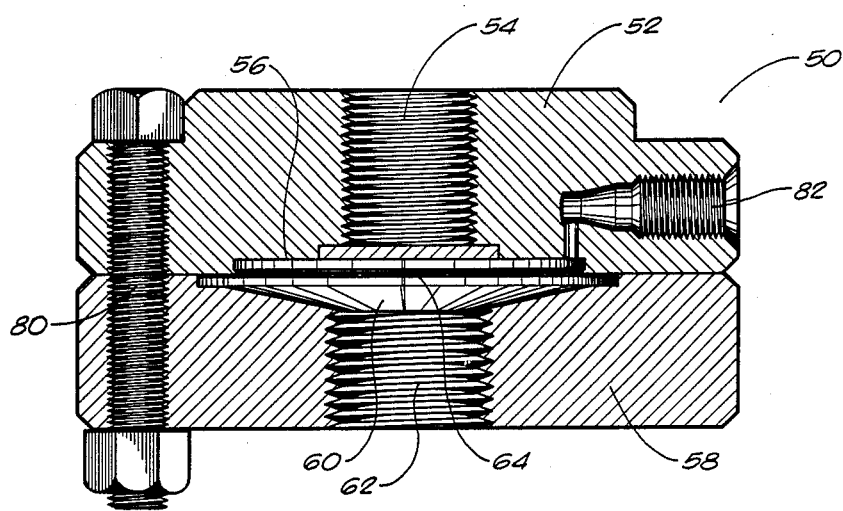
FIG. 5 is a transverse sectional view of a diaphragm seal incorporating the diaphragm of the present invention.

The diaphragm seal and diaphragm assembly utilizing the present invention is shown, in detail, in FIG. 5. The assembly 50 of FIG. 5 includes instrument flange 52. Instrument flange 52 has threaded instrument connection 54. A gauge or instrument may be secured, by the use of an externally threaded section, so as to allow the gauge to be in communication with cavity 56. The instrument flange 52 is secured in face-to-face abutment with process flange member 58. Process flange member 58 has a cavity 60 which is adapted to be connected to a process flow line or receptacle to the internally threaded opening 62. As used with this instrument, it will be understood that the term "pressure" is intended to broadly include subatmospheric pressures as well as greater than atmospheric pressures. It will also be understood that, although the unit is described as being mounted directly on a pipe line or process vessel, the principles of the invention can also be utilized in those applications where the sensing unit is more remote from the pressure source. A flexible diagram 64 of the type described in the present invention is mounted to the instrument flange 52 so as to provide a partition between the cavity 56 and the cavity 60. The diaphragm 64 of FIG. 5 roughly shows the corrugations described herein previously. The clamping flange portion 13 of the discal body 10 is mounted between the instrument flange 52 and the process flange 58.

Figure 6:
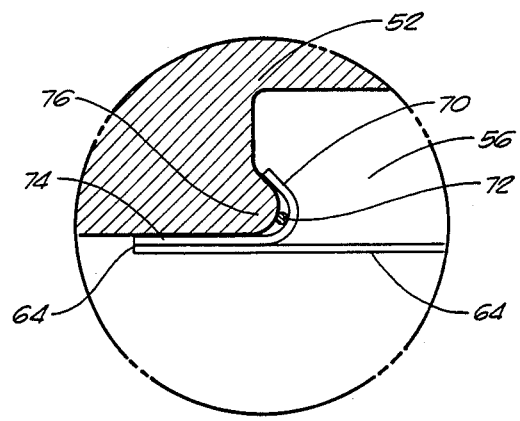
FIG. 6 is an enlarged view of the circled area of FIG. 5 showing, in detail, the manner in which the diaphragm is coupled to the instrument flange.

As shown in FIG. 6, there is a detailed view showing the manner in which the diaphragm 64 is snapped into its self-retaining position shown in the circled area of FIG. 5. In particular, the outwardly turned lip 70 has instrument flange gasket 72 interposed between the wall of lip 70 of holding ring 74 and the inwardly extending projection 76 of instrument flange 52. The size and shape of the outwardly extending lip 70 will generally match the configuration of the inwardly extending projection 76 of instrument flange 52. The flexibility of the diaphragm 64 and of the lip 70 allows the sealing relation to be established between the diaphragm 64 and the cavity 56 of instrument flange 52. In this snap-fit relationship, the diaphragm 64 will be properly centered and retained in the position illustrated in FIG. 6.

Ordinarily, the pressures on the opposite sides of the diaphragm 64 are in equilibrium so that there is no significant differential pressure within the instrument cavity 56 which will tend to displace the diaphragm 64 from its snap-in securement. For test purposes and for a margin of safety, the lip 70 may be of a length sufficient to resist displacement of the diaphragm 64 when exposed to a differential pressure of one atmosphere in the cavity 56. This is merely presented by way of example and is not to be construed as a limitation. The necessary length of the lip 70 will also be affected by the strength, resiliency and physical characteristics of the material which is used for the diaphragm 64. The factors affecting the dimension of the lip 70, to achieve the desired adequate securement, must be compromised with the need for ease of assembly so that the installation of the diaphragm 64 should not be unduly difficult or complicated. The evaluation of such factors to properly dimension the length of the lip 70 is well within the skill of the art and requires no further elaboration.

Ordinarily, the clamping flange area 74 (or marginal portion) will extend outwardly from the cavity 56 to a greater extent than the lip 70. It is desirable that the portion 74 present a substantial surface area to the process cavity 60, as well as to the clamping surfaces of the coupling members 52 and 58 between which it is retained. Bolt 80 rigidly affixes these flanges 52 and 58 in face-to-face relationship. Bolt 80 may be tightened as need to establish a suitable seal. A bleed valve 82 extends inwardly and communicates with the instrument cavity 56 so as to remove excess fluid and pressure, as needed.

When the device is assembled, in the manner illustrated in FIGS. 5 and 6, and with the cavity 56 substantially filled with a light oil or other suitable hydraulic medium, the O-ring 72 effects a seal against leakage of the instrument fluid from the cavity 56 regardless of whether the flange members 52 and 58 are clamped together or not. However, when the flange members are clamped together there is an additional axial thrust or force transferred to and imposed upon the O-ring 72 which further augments the sealing force imposed upon the O-ring by its engagement with the projection 76 of instrument flange 52.

The present invention also includes a unique method for manufacturing a diaphragm seal. This method of manufacturing includes the steps of: (1) stamping the discal body 10 from a sheet of metal having a thickness of not greater than 0.005 inches; (2) the holding ring is then stamped from a thicker sheet of metal; (3) an outwardly turned lip is then formed on the inner edge of the holding ring for the purpose of receiving an O-ring-type of seal; and (4) the holding ring is then welded to the periphery of the discal body such that the holding ring is affixed to and juxtaposed against this discal body. A compressible O-ring seal is inserted into the area defined by the outwardly turned lip such that the lip exerts a compressive force onto the O-ring. During the formation of the discal body, the method includes the steps of forming a plurality annular corrugations in a radial periodic waveform in the discal body and forming a plurality of radially extending spokes in the discal body in a circumferential periodic waveform conforming to and integrated with the peaks and valleys of the annular corrugations.

This method of manufacturing is unique, in particular, because of the quality the metal utilized. As stated previously, a very thin disc of metal must be used for the diaphragm. Since the metal for the discal body is too thin to be utilized as the holding ring, a separate step of manufacturing the holding ring is required for the formation of the diaphragm of the present invention. Since it is very difficult to weld such thin pieces of metal together, it was found that a plasma tig welder accomplished this welding purpose by fusing the peripheries of the holding ring and the discal body together. This fusion allowed strong attachment forces without the additional of any thickness to the juncture of the holding ring and the discal body. As a result, the flexibility of the diaphragm seal is maintained while permitting strong holding forces to be exerted by the holding ring upon the discal body. The formation of the outwardly turned lip is important so as to accommodate a very small diameter O-ring. As stated previously, the problem of hysteresis requires a very small volume of compressible material.

The assembly of the present invention is a metallic snap-in diaphragm that permits clean out when in use. As stated previously, U.S. Pat. No. 3,645,139 described a "snap-in" type of diaphragm seal. Unfortunately, this patented diaphragm seal cannot be economically utilized in metallic types of diaphragm seals. Assembly and manufacturing requirements make it virtually impossible to recreate the TEFLON construction of U.S. Pat. No. 3,645,139 so as to allow for the snap-in feature. The present invention achieves the advantages of this prior patented technique in combination with a metallic diaphragm. Metallic diaphragms are appropriate and preferable in processes which pass chlorine or chlorine derivatives.

The metal diaphragm of the present invention can easily be assembled into the instrument flange by simply hand assembling the diaphragm into a mating groove which is machined into the instrument flange thereby contacting the preassembled instrument flange gasket and insuring minimal possibility of leakage of the liquid fill. When thus assembled, the instrument flange, instrument flange gasket and metal diaphragm become an integral, self-contained unit that will withstand the necessary handling of subsequent operations (i.e. when liquid filling and attaching a pressure instrument). It can be shelved or stored for later use. The present invention eliminates the need for an often expensive middle clamping ring used by some other diaphragm assemblies. This allows for easy replacement. Furthermore, because no clamping ring is needed, there are fewer parts required by the assembly. In general, the present invention is more sensitive because of the increased displacement of the metal seal at a given pressure. The present invention eliminates the need for an often costly machined middle ring to retain the diaphragm. The process pressure keeps the diaphragm holding ring against the instrument flange so as to insure non-extrusion of the instrument flange gasket. The flanges bolt up metal-to-metal with fewer bolts. Less skill is required to tighten the bolts and assemble the instrument. Additionally, the present invention, in combination with the instrument flange, can be disassembled and reassembled many times. This can be done simply, quickly, and with no loss of liquid fill. As a result, the present invention offers a number of significant benefits over the prior art diaphragm seals.

The foregoing disclosure and description of the invention is illustrative and explanatory thereof. Various changes in the details of the illustrated construction or in the details of the method of manufacturing may be made within the scope of the appended claims without departing from the true spirit of the invention. The present invention should be limited by the following claims and there legal equivalents.

I claim:

1. A fluid pressure responsive diaphragm comprising:
   a discal body;
   a holding ring fastened to said discal body, said holding ring having an outwardly curved lip formed at the inner edge of said holding ring, said outwardly curved lip being inward of the outer edge of said discal body, said holding ring having a thickness greater than the thickness of said discal body.

2. The diaphragm of claim 1, said discal body having a material thickness of not greater than 0.005 inches.

3. The diaphragm of claim 1, said discal body having a plurality of annular corrugations in a radial periodic waveform configuration and a plurality of radially-extending spokes in said discal body in a circumferential periodic waveform conforming to and integrated with the peaks and valleys of said annular corrugations.

4. The diaphragm of claim 1, said holding ring having a material thickness of between 0.005 and 0.022 inches.

5. The diaphragm of claim 3, said holding ring fastened to and aligned with the periphery of said discal body, said outwardly turned lip adjacent the outermost annular corrugation.

6. The diaphragm of claim 5, said holding ring welded to the periphery of said discal body.

7. The diaphragm of claim 1, said outwardly curved lip having a roughly U-shaped configuration, said outwardly curved lip suitable for receiving and retaining an O-ring therewithin.

8. The diaphragm of claim 1, said discal body and said holding ring being metallic.

9. A fluid pressure-responsive diaphragm comprising:
   a discal body;
   a holding ring fastened to said discal body, said holding ring having an outwardly turned lip formed at the inner edge of said holding ring, said holding ring having a thickness greater than the thickness of said discal body; and
   a compressible seal received within the area defined by said outwardly turned lip.

10. A diaphragm assembly for a recording instrument comprising:
    a first coupling member having a cavity in communication with the instrument, an annular projection of said first coupling member extending inwardly into said cavity;
    a metallic self-retaining pressure-responsive diaphragm comprising:
      a discal body; and
      a holding ring fastened to said discal body, said holding ring having an outwardly turned lip adjacent the inner edge of said holding ring, said holding ring having a thickness greater than the thickness of said discal body; and
    a compressible seal for said cavity received within the area defined by said outwardly turned lip and said annular projection of said coupling member, said outwardly turned lip of said holding ring being deformable for releasably securing said diaphragm to said cavity.

11. The diaphragm assembly of claim 10, said holding ring welded to said discal body.

12. The diaphragm assembly of claim 10, said discal body having a plurality of annular corrugations in a radial periodic waveform configuration and a plurality of radially-extending spokes in said discal body in a circumferential periodic waveform conforming to and integrated with the peaks and valleys of said annular corrugations, said holding ring fastened to and aligned with the periphery of said discal body, said outwardly turned lip adjacent the outermost annular corrugation.

13. The diaphragm assembly of claim 10, said discal body having a material thickness of not greater than 0.005 inches, said holding ring having a material thickness of between 0.005 and 0.022 inches.

14. The diaphragm assembly of claim 10, said outwardly turned lip exerting a compressive force on said compressible seal in the direction of the general plane of said diaphragm.

15. The diaphragm assembly of claim 10 further comprising:
    a second coupling member secured in face-to-face relationship with said first coupling member and defining a second cavity on the side of said diaphragm opposite said holding ring and opposite said first-named cavity.

* * * * *